United States Patent
King et al.

(10) Patent No.: US 6,585,999 B1
(45) Date of Patent: Jul. 1, 2003

(54) ENERGY BAR

(75) Inventors: Roderick Frederick Gerardus Joseph King, West Yorkshire (GB); Richard William Gale, North Yorkshire (GB); Simon Edmund George Lester, London (GB)

(73) Assignee: Galatogen Products Limited, London (GB)

(*) Notice: Subject to any disclaimer, the term of this patent is extended or adjusted under 35 U.S.C. 154(b) by 0 days.

(21) Appl. No.: 09/692,516

(22) Filed: Oct. 18, 2000

(30) Foreign Application Priority Data

Oct. 19, 1999 (GB) ............................. 9924650.6

(51) Int. Cl.$^7$ ................. A61K 9/68; A61K 31/715; A01N 33/04; A01N 65/00
(52) U.S. Cl. .................... 424/440; 514/23; 514/54; 514/68
(58) Field of Search .................. 424/439, 489, 424/440; 514/565, 2, 23, 54, 60, 574, 634, 665

(56) References Cited

U.S. PATENT DOCUMENTS

| | | |
|---|---|---|
| 5,032,411 A | 7/1991 | Stray-Gundersen |
| 5,401,524 A | 3/1995 | Burkes et al. |
| 5,587,190 A | 12/1996 | Guezennec et al. |
| 5,612,074 A | 3/1997 | Leach |
| 5,726,146 A * | 3/1998 | Almada et al. ............ 514/2 |
| 5,780,094 A | 7/1998 | King |
| 5,843,921 A | 12/1998 | Kaufman |

FOREIGN PATENT DOCUMENTS

| | | |
|---|---|---|
| EP | 0 184 121 B2 | 6/1986 |
| EP | 0 223 540 B1 | 5/1987 |
| EP | 0 340 491 A1 | 11/1989 |
| EP | 0 349 712 A1 | 1/1990 |
| EP | 0745333 A1 | 12/1996 |
| WO | WO 90/02494 | 3/1990 |
| WO | WO9608979 A1 | 3/1996 |
| WO | WO 96/18313 | 6/1996 |
| WO | WO97/49304 | 12/1997 |
| WO | WO98/06418 | 2/1998 |
| WO | WO98/53704 | 12/1998 |

OTHER PUBLICATIONS

Peyrebrune et al., The effects of oral creatine supplementation on performance in single and repeated sprint swimming, 1998, Journal of Sports Sciences, pp. 271–279.

Subject Matter Search Report dated Nov. 30, 2000, 14 pages.

Koivisto, VA et al., "Carbohydrate ingestion before exercise: comparison of glucose fructose, and sweet placebo". J. Appl. Physiol. 51(4): pp. 783–787, 1981.

Koivisto, VA et al., "Glycogen depletion during prolonged exercise: influence of glucose, fructose or placebo". J. Appl. Physiol. 58(3): pp. 731–737, 1985.

Williams, CA et al., "The influence of glucose on serum galactose levels in man", Metabolism 1983; 32:250–256.

Fried, R. et al., "Early glycogenolysis and late glycogenesis in human liver after intravenous administration of galactose", Am J Physiol 270(1):G14–19;1996.

Samols, E. et al., "Insulin response to fructose and galactose". The Lancet. 1:478–479, 1963.

Ganda, OP et al., "Matabolic effects of glucose, mannose, galactose, and fructose in man". J Clin Endocrinol Metab 1979; 49: 616–621.

Adopo, E. et al., "Respective oxidation of exogenous glucose and fructose given in the same drink during exercise". J. Appl Physiol 1994; 76: 1014–1019.

Green, AL et al., "Carbohydrate ingestion augments skeletal muscle creatine accumulation during creatine supplementation in man". Am J Physiol 1996; 271: E812–826.

Green, AL et al., "Carbohydrate ingestion augments creatine retention during creatine feeding in man". Acta Physiol Scan 1996; 158:195–202.

Vanden berghe, K. et al., "Long term creatine is beneficial to muscle performance during resistance training". J Appl Physiol 1997; 83: 2055–2063.

Volek, JS et al., "Performance and muscle fiber adaptations to creatine supplementation and heavy resistance training", Med Sci Sports Exerc 1999; 31:1147–1157.

Balsom, PD et al., "Creatine supplementation and dynamic intensity intermittent exercise", Scand J Med Sci Sports 1993; :I: 143–149.

Haughland, RB et al., "Insulin effect on creatine transport in skeletal muscle". Proc Soc Expt Biol and Med 1975; 148: 1–4.

Green, AL et al., "Creatine ingestion augments muscle creatine uptake and glycogen synthesis during carbohydrate feeding in man". J Physiol 1996; 491:63–64P.

Fitch, CD et al., "Creatine metabolism in skeletal muscle". J. Biol Chem 1968; 243: 2024–2027.

Koszalska, TR et al., "Effect of insulin on creatinuria and hypercreatinemia induced by creatine loading". Proc Soc Exp Biol Med. 1970; 135: 905–910.

Koszalska, TR et al., "Effect of insulin on the uptake of creative–1–$^{14}$C by skeletal muscle in normal and X–irradiated rats and hypercreatinemia induced by creatine loading". Proc Soc Exp Biol Med. 1972; 139: 1265–1271.

* cited by examiner

Primary Examiner—Jon P. Weber
Assistant Examiner—Patricia D Patten
(74) Attorney, Agent, or Firm—Beyer Weaver & Thomas LLP

(57) ABSTRACT

An energy multi-saccharide food product including:

a saccharide component including 5 to 20% w/w galactose;

0 to 25% w/w creatine; and optional further ingredients selected from: carbohydrate, fiber and fat.

7 Claims, No Drawings

ENERGY BAR

This invention relates to high energy multi-saccharide food products containing the substance galactose, which find use as an ergogenic aid, particularly but not exclusively for persons participating in sports or other forms of exercise. The products of this invention also find use in cases of hunger or fatigue in the general population.

Exercise makes excessive demands on substrates both within and external to the muscle. Carbohydrates are especially important as precursors of glycogen both in liver and muscle and as an energy source which can be used immediately. Accordingly there is a need for a short term energy supply during anaerobic and aerobic conditions. It is also a requirement for carbohydrates which serve as precursors either directly or indirectly for synthesis of glycogen in liver and muscle. Muscle cannot function efficiently or at a high level of power output if reserves of glycogen are low or sub-optimal. Depletion of glycogen in athletes results in poor performance and poor efficiency. Use of specific carbohydrates as an ergogenic aid has been proved to increase or maintain the stores of glycogen and availability of blood glucose.

The food products of this invention may comprise chewable or edible bars, sweets, cookies, biscuits, lozenges or chewing gum. Chewable or edible bars are preferred.

According to the present invention a high energy multi-saccharide food product comprises a saccharide component including 3 to 37% w/w galactose, 0 to 25% w/w of creatine and optional further ingredients selected from carbohydrate; fibre and fat.

Amounts and percentages in this specification are by weight unless indicated otherwise and are selected to total 100%.

The amount of galactose is preferably 5 to 20%, more preferably 5 to 15%.

The saccharide component also includes glucose. In a first preferred embodiment equal amounts of glucose and galactose are provided. In a second preferred embodiment the amount of galactose is greater than the amount of glucose.

Use of galactose affords several advantages. It is not insulogenic, that is it does not itself induce an insulin response, hence its use is associated with less of an insulin response than the equivalent mass of glucose. Products in accordance with this invention may be used by diabetics or persons who are intolerant to lactose. Galactose can be used rapidly by the liver for synthesis of glycogen or glucose. It is less likely to cause dental erosion than other sugars.

Use of creatine is optional. Preferred embodiments of the invention incorporate 10 to 25% creatine. The use of creatine is preferably such that the conversion to creatinine is inhibited. This conversion is a natural equilibrium. Creatinine is rapidly excreted by the kidneys. In order to minimise or prevent conversion to creatinine it is preferred that the creatine is encapsulated as granules or powder in a dry water-impervious shell. Micro-encapsulation is preferred. In this way the creatine is released in the stomach by dissolution. Alternatively the creatine may be isolated from the moist part of an edible bar by formulation in layers alternatively or in addition to encapsulation. For example the creatine may be contained in a separate layer of the food bar or lozenge.

Food products in accordance with this invention are useful in general cases of creatine depletion, for example in vegetarians or individuals where build-up of muscle function is needed or is clinically advisable.

Exercise makes excessive demands on substrates both within and external to muscle. Creatine phosphate is derived from both dietary creatine and from endogenous synthesis. Creatine phosphate is essential for short term energy supply during anaerobic conditions and also for energy transfer from mitochondria to contractile muscle. Muscle cannot function efficiently or at a high level of power output if reserves of creatine are low or sub-optimal. Depletion of creatine in athletes causes poor performance and poor efficiency.

Galactose may be provided as a pure ingredient which is mixed with glucose, starch and other ingredients during manufacture. Alternatively a glucose-galactose syrup such as may be prepared by hydrolysis of lactose may be employed. The amount of galactose in such a syrup may be supplemented by additional pure galactose.

Use of fibre in the bar is advantageous because different fibre products influence the release of sugars, affect the binding of various components and advantageously delay digestion. An amount of 0 to 5% may be employed. Furthermore the galactose or galactose-glucose syrup may be absorbed onto the fibre prior to manufacture. In this way the absorption of galactose may be retarded.

In an alternative embodiment the food products may have an external coating containing galactose in order to facilitate rapid absorption of galactose.

Formulations having a higher concentration of galactose are preferred in order to enhance galactose up-take by the liver and rapid production of glycogen. Increased amounts of galactose decrease the amount of lipid manufactured from glucose. Galactose is not a direct fat precursor. This is advantageous as lipids do not afford a rapid energy source.

The invention is further described by means of example but not in any limitative sense.

The following Tables and Examples list the ingredients of compositions of food products in accordance with this invention. These products may be manufactured into bars, sweets or lozenges using conventional methods.

In a layered arrangement the creatine powder or aggregate may be covered with a hard dry sugar layer. Alternatively or in addition a chocolate containing layer may be used as a moisture barrier. The creatine containing layer may be provided as a laminar cylindrical layer disposed within the bar as the inner layer. In this way the creatine containing component may be encapsulated. Alternatively or in addition ingredients such as fibre, nuts and dried fruit may be layered onto the creatine to form a laminate. The fibre layer may incorporate syrup to form a composite layer.

The outermost layer of the bar or other food product may comprise a single thin layer of hard sugar for example composed of galactose or a mixture of galactose with glucose or sucrose. Such an arrangement of the sugar layer dissolves rapidly when portions of the bar pass into the stomach.

In alternative food products the creatine powder or aggregate may be covered with a hard sugar mixture, chocolate or both to form particles with a mass of 100 to 500 mg. These can be combined with the remaining ingredients to form dispersed units within the matrix, for example as chocolate chips within a cookie. Such an encapsulated arrangement may incorporate layers as previously described.

The following tables contain general ranges of preferred ingredients.

TABLE 1

| Ingredient | Range (% w/w) | Comments |
|---|---|---|
| Carbohydrate | 50–75 | Mono, di, oligosaccharides, syrup etc. |
| Fat | 0–10 | Saturated and unsaturated |
| Fibre | 0–10 | |
| Creatine | 0–25 | As monohydrate |
| Protein | 0–15 | |
| Vitamins | 50–100% of RDA | Full range |
| Galactose | 5–20 | |

TABLE 1-continued

| Ingredient | Range (% w/w) | Comments |
|---|---|---|
| Dried Fruit | 0–15 | |
| Seeds and Nuts | 0–15 | |
| Glucose | 0–10 | |
| Flavours | As necessary | |
| Stabilisers | 1–3 | |
| Water | 0–30 | |

TABLE 2

| | Example 1 | Example 2 | Example 3 | Example 4 | Example 5 | Example 6 |
|---|---|---|---|---|---|---|
| Cornstarch | 20 g | 10 g | 20 g | 10 g | 10 g | 8 g |
| Maltodextrin | 20 g | 10 g | 20 g | 10 g | 10 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |
| Fat | 10 g | 10 g | 10 g | 10 g | 10 g | 5 g |
| Fibre | 5 g | 5 g | 5 g | 5 g | 5 g | 5 g |
| Creatine | — | 20 g | — | 20 g | — | 20 g |
| Vitamins | 1 g | 1 g | 1 g | 1 g | 1 g | 1 g |
| Protein | 10 g | 10 g | 10 g | 10 g | 10 g | 7 g |
| Flavours | 1 g | 1 g | 1 g | 1 g | 1 g | 1 g |
| Stabilisers | 2 g | 2 g | 2 g | 2 g | 2 g | 2 g |
| Water | 11 g | 11 g | 11 g | 11 g | 11 g | 11 g |
| Fruit | — | — | — | — | 10 g | 10 g |
| Seeds and Nuts | — | — | — | — | 10 g | 10 g |

| | Example 7 | Example 8 | Example 9 | Example 10 | Example 11 | Example 12 |
|---|---|---|---|---|---|---|
| Cornstarch | 20 g | 10 g | 20 g | 10 g | 10 g | 8 g |
| Maltodextrin | 20 g | 10 g | 20 g | 10 g | 10 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |
| Fat | 10 g | 10 g | 10 g | 10 g | 10 g | 5 g |
| Fibre | 5 g | 5 g | 5 g | 5 g | 5 g | 5 g |
| Creatine | — | 20 g | — | 20 g | — | 20 g |
| Vitamins | 1 g | 1 g | 1 g | 1 g | 1 g | 1 g |
| Protein | 10 g | 10 g | 10 g | 10 g | 10 g | 7 g |
| Flavours | 1 g | 1 g | 1 g | 1 g | 1 g | 1 g |
| Stabilisers | 2 g | 2 g | 2 g | 2 g | 2 g | 2 g |
| Water | 5 g | 5 g | 5 g | 5 g | 5 g | 5 g |
| Fruit | 3 g | 3 g | 3 g | 3 g | 13 g | 13 g |
| Seeds and Nuts | 3 g | 3 g | 3 g | 3 g | 13 g | 13 g |

| | Example 13 | Example 14 | Example 15 | Example 16 | Example 17 | Example 18 |
|---|---|---|---|---|---|---|
| Cornstarch | 15 g | 5 g | 15 g | 5 g | 5 g | 8 g |
| Maltodextrin | 15 g | 5 g | 15 g | 5 g | 5 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |
| Fat | 10 g | 10 g | 10 g | 10 g | 18 g | 3 g |
| Fibre | 5 g | 5 g | 5 g | 5 g | 2 g | 2 g |
| Creatine | — | 20 g | — | 20 g | — | 20 g |
| Vitamins | 1 g | 1 g | 1 g | 1 g | 1 g | 1 g |

TABLE 2-continued

| Protein | 5 g | 5 g | 5 g | 5 g | 5 g | 2 g |
|---|---|---|---|---|---|---|
| Flavours | 1 g | 1 g | 1 g | 1 g | 1 g | 1 g |
| Stabilisers | 2 g | 2 g | 2 g | 2 g | 2 g | 2 g |
| Water | 20 g | 20 g | 20 g | 20 g | 20 g | 20 g |
| Fruit | 3 g | 3 g | 3 g | 3 g | 13 g | 13 g |
| Seeds and Nuts | 3 g | 3 g | 3 g | 3 g | 8 g | 8 g |

What is claimed is:

1. An energy multi-saccharide food product comprising:

| galactose | 5 to 20% |
|---|---|
| creatine | 10 to 25% |
| saccharide | 50 to 75% |
| fibre | 5 to 10% | and optional further ingredients, wherein the ingredients total 100%;

wherein the creatine is comprised of granules or powder encapsulated in a dry, water-impervious shell; and wherein the food product is effective for short term replenishment of glycogen reserves.

2. A food product as claimed in claim 1, wherein the amount of galactose is 5 to 15%.

3. A food-product as claimed in claim 1, wherein the saccharide includes glucose.

4. A food product as claimed in claim 3, wherein there are equal amounts of galactose and glucose.

5. A food product as claimed in claim 3, wherein the amount of galactose is greater than the amount of glucose.

6. A food product as claimed in claim 1, wherein the creatine is contained in a layer separate from other ingredients of the food product.

7. A food product as claimed in claim 1, having an outermost layer of hard sugar comprising galactose or a mixture of galactose and sucrose.

* * * * *